(12) United States Patent
Wrighton et al.

(10) Patent No.: US 12,032,950 B2
(45) Date of Patent: Jul. 9, 2024

(54) EMBEDDING CODE FROM MODULES ACROSS VERSIONING BOUNDARIES

(71) Applicant: Microsoft Technology Licensing, LLC, Redmond, WA (US)

(72) Inventors: David Charles Wrighton, Redmond, WA (US); Anton Lapounov, Kirkland, WA (US); Tomáš Rylek, Suchdol (CZ); Jan Kotas, Redmond, WA (US)

( * ) Notice: Subject to any disclaimer, the term of this patent is extended or adjusted under 35 U.S.C. 154(b) by 100 days.

(21) Appl. No.: 17/960,058

(22) Filed: Oct. 4, 2022

(65) Prior Publication Data

US 2024/0111518 A1   Apr. 4, 2024

(51) Int. Cl.
| | |
|---|---|
| *G06F 9/44* | (2018.01) |
| *G06F 8/41* | (2018.01) |
| *G06F 8/654* | (2018.01) |
| *G06F 8/71* | (2018.01) |
| *G06F 11/36* | (2006.01) |
| *G06F 11/34* | (2006.01) |

(52) U.S. Cl.
CPC ............ *G06F 8/654* (2018.02); *G06F 8/4443* (2013.01); *G06F 8/71* (2013.01); *G06F 8/441* (2013.01); *G06F 8/443* (2013.01); *G06F 8/4434* (2013.01); *G06F 8/447* (2013.01); *G06F 11/3419* (2013.01); *G06F 11/3628* (2013.01)

(58) Field of Classification Search
CPC . G06F 8/654; G06F 8/71; G06F 8/447; G06F 8/443; G06F 8/4434; G06F 8/4441; G06F 8/4443; G06F 11/3419; G06F 11/3628
See application file for complete search history.

(56) References Cited

U.S. PATENT DOCUMENTS

| | | | | |
|---|---|---|---|---|
| 10,229,031 B2 * | 3/2019 | Chiu | .................... | G06F 11/3628 |
| 2018/0373515 A1 * | 12/2018 | Brown | .................. | G06F 8/4434 |

OTHER PUBLICATIONS

Wen-mei W. Hwu et al., Inline Function Expansion for Compiling C Programs, 1989, [Retrieved on Feb. 28, 2024]. Retrieved from the internet: <URL: https://dl.acm.org/doi/pdf/10.1145/73141.74840> 12 Pages (246-257) (Year: 1989).*

Patrick W. Sathyanathan et al., Incremental Whole Program Optimization and Compilation, 2017 IEEE, [Retrieved on Feb. 28, 2024]. Retrieved from the internet: <URL: https://ieeexplore.ieee.org/stamp/stamp.jsp?tp=&arnumber=7863742> 12 Pages (221-232) (Year: 2017).*

* cited by examiner

*Primary Examiner* — Anibal Rivera
(74) *Attorney, Agent, or Firm* — Workman Nydegger (57) ABSTRACT

A computing system and method for determining if a first software component that has shipped separately from a second software component has been updated. An inline expansion process copies a first method of the first software component into a first method of a second software component is performed so that the copied first method is executable when the second method of the second software component is executed. The first method from the first software component is copied into metadata that is attached to the first method of the second software component. The copy of the first method in the metadata is used to validate that the first method in the first software component has not been updated.

20 Claims, 9 Drawing Sheets

400

Perform An Inline Expansion Process That Copies A First Method From A First Software Component Into A First Method Of A Second Software Component 410

↓

Copy The First Method From The First Software Component Into Metadata That Is Attached To The First Method Of The Second Software Component 420

↓

Use The Copy Of The First Method In The Metadata To Validate That The First Method In The First Software Component Has Not Been Updated 430

EMBEDDING CODE FROM MODULES ACROSS VERSIONING BOUNDARIES

BACKGROUND

In computing systems, it is common for a second software component to make one or more function calls into a first software component so that the second software component can access the functionality of the first software component. However, if there are a large number of function calls, system performance may be lessened due to the high function-calling-overhead. Accordingly, it is common for the computing systems to implement inline expansion or inlining to improve the system performance.

Inline expansion is a process where at compile time the function calls from the second software component are replaced by copying the code from the first software component that was the subject of the function calls. In addition, other optimizations can be made to the inlined code. Since the high function-calling-overhead is removed, system performance can be improved.

While inline expansion works well to improve the system performance a problem arises when the first and second software components are updated and shipped separately. For example, if the first software component is updated and shipped, then the code that was inlined from the first software component into the second software component will no longer be up to date and this may cause the second software component to improperly execute. In the past, the solution to this problem was to not use inline expansion on software components that could be updated and shipped separately, which in turn removed all the benefits of inline expansion.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The embodiments disclosed herein solve the problems discussed above. For example, the embodiments disclosed herein provide a mechanism where software components can be updated and/or shipped separately while still allowing all the advantages of the inline expansion process. For example, the embodiments disclosed herein store a copy of a method from a first software component that has been inlined into a second software component in metadata that is attached to the second software component. The metadata also includes instructions that specify that, prior to execution of the inlined method in the second software component, a validation process should be performed to ensure that the inlined method has not been updated. The copy of the method stored in the metadata is used to perform the validation process, which may include comparing the copy of the method stored in the metadata with the method from the first software component. If it is validated that the inlined method has not been updated, then the second software component can be executed.

One embodiment is related to a computing system and method for determining if a first software component that has shipped separately from a second software component has been updated. An inline expansion process copies a first method of the first software component into a first method of a second software component is performed so that the copied first method is executable when the second method of the second software component is executed. The first method from the first software component is copied into metadata that is attached to the first method of the second software component. The copy of the first method in the metadata is used to validate that the first method in the first software component has not been updated.

In the embodiment, the first method in the second software component is executed when it is validated that that the first software component has not been updated. However, if it is not validated that the first software component has not been updated, then the first method in the second software component is not executed. Rather, the original version of the first method of the second software component that existed before the inline expansion process and that includes a function call to the first method of the first software component is executed so that the updated method code can be accessed.

In the embodiment, the validation may compare a copy of the first method in the metadata with the first method in the first software component and then determine if the first method in the first software component has been updated based on the comparison. The first method of the second software component is executed when it is determined that the copy of the first method in the metadata matches the first method in the first software component and is not executed when there is no match. Rather, the original version of the first method of the second software component that existed before the inline expansion process and that includes a function call to the first method of the first software component is executed so that the updated method code can be accessed.

In the embodiment, the validation may compare memory blocks used by the copy of the first method in the metadata with memory blocks used by the first method in the first software component and then determine if the first method in the first software component has been updated based on the comparison. The first method of the second software component is executed when it is determined that the memory blocks used by the copy of the first method in the metadata matches the memory blocks used by the first method in the first software component and is not executed when there is no match. Rather, the original version of the first method of the second software component that existed before the inline expansion process and that includes a function call to the first method of the first software component is executed so that the updated method code can be accessed.

One embodiment is related to a computing system for determining if a first software component that has shipped separately from a second software component has been updated. In the embodiment, in response to a function call included in a first method of the second software component, an inline expansion process is performed that copies a first method from the first software component into the first method of the second software component. The first method of the first software component is ahead-of-time (AOT) compiled when being copied into the first method of the first software component. The first method is copied from the first software component into metadata that is attached to the first method of the second software component. The first method of the first software component is compared with the first method of the first software component that is copied into the metadata to determine if the first method of the first software component has been updated.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not, therefore, to be considered to be limiting in scope, embodiments will be described and explained with additional specificity and details through the use of the accompanying drawings in which.

DETAILED DESCRIPTION

The embodiments disclosed herein solve the problems discussed above. For example, the embodiments disclosed herein provide a mechanism where software components can be updated and/or shipped separately while still allowing all the advantages of the inline expansion process. For example, the embodiments disclosed herein store a copy of a method from a first software component that has been inlined into a second software component in metadata that is attached to the second software component. The metadata also includes instructions that specify that, prior to execution of the inlined method in the second software component, a validation process should be performed to ensure that the inlined method has not been updated. The copy of the method stored in the metadata is used to perform the validation process, which may include comparing the copy of the method stored in the metadata with the method from the first software component. If it is validated that the inlined method has not been updated, then the second software component can be executed.

Figure 1:
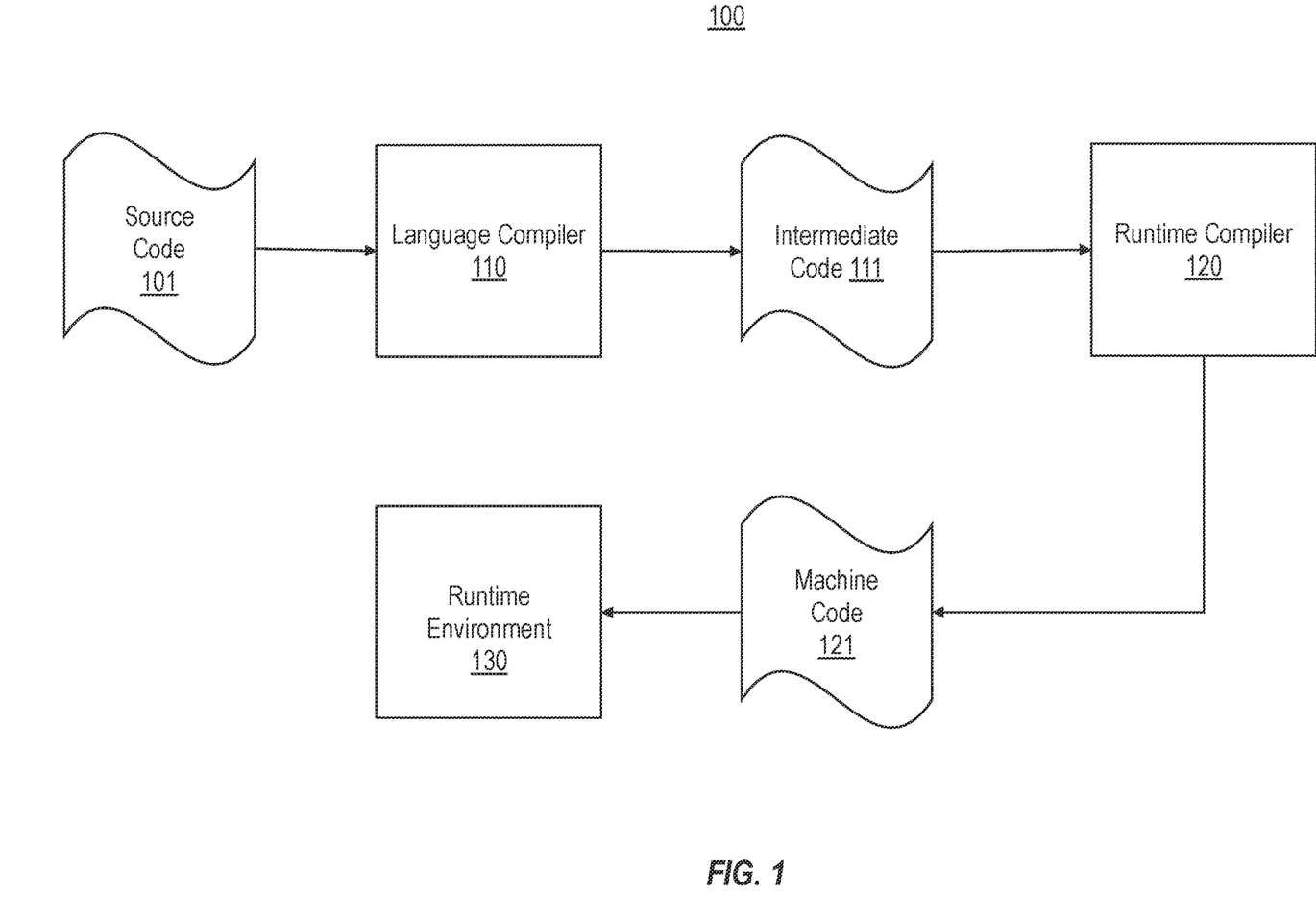
FIG. 1 illustrates a process flow associated with an example compilation and execution of software, including the compilation of intermediate code from source code, the compilation of machine code from that intermediate code, and the execution of that machine code in a runtime environment.

As the embodiments disclosed herein are related to the compilation and execution of software, these concepts will now be discussed. FIG. 1 illustrates a process flow 100 associated with an example compilation and execution of software in a computing system. In the case of the process flow 100, compilation occurs in two distinct stages at two distinct times. Namely, compilation occurs first in a source language compilation stage at a source language compilation time, and thereafter compilation occurs in a platform compilation stage at a platform compilation time. In the example process flow 100 of FIG. 1, at source language compilation time, a language compiler 110 compiles source code 101 into intermediate code 111.

The source code 101 is authored in a source code language and thus conforms to semantic rules defined by the source code language. Examples of source code languages include Java, C#, Pascal, Python, JavaScript, amongst many others. In general, source code language uses textual structures and semantic rules that are more intuitive to a human programmer to express software functionality. The language compiler 110 is configured to compile source code of a particular source code language. As examples, there are Java compilers, C#compilers, Pascal compilers, Python compilers, Javascript compilers, and compilers for all other source code languages. The language compiler 110 is considered a front-end compiler and may perform lexical, syntactic and semantic analysis to generate the intermediate code 111.

The intermediate code 111 is code format that can be executed across a broad spectrum of different platforms after compilation by an appropriate runtime compiler. That is, the runtime compiler for a particular platform will take into consideration that platform-specific runtime environment, and compile the intermediate code 111 into machine code that is targeted to, and optimized for, the corresponding platform. The intermediate code 111 may also be independent of the source code language from which it was compiled. However, intermediate code can be either source code language specific or source code language independent. Examples of intermediate code include Byte Code which is specific to Java. There is also three-address code, which is source language independent. As another example, there is an intermediate language called "Common Intermediate Language" (or CIL) that is designed for runtime compilers used by the .NET framework.

At platform compilation time, a runtime compiler 120 compiles the intermediate code 111 into machine code 121. The runtime compiler 120 may implement various optimization algorithms and transforms that produce a semantically equivalent output program that uses fewer resources or executes faster.

After compilation, at execution time, the compiled code is executed by a runtime environment 130. As depicted in FIG. 1, at execution time, the runtime environment 130 executes the machine code 121 to accomplish within the runtime environment 130 the functionality original described in the source code 101. In some embodiments, the runtime environment 130 is a managed runtime that manages the execution of the compiledcode, rather than executing directly at a processor, such as the Common Language Runtime (CLR), which is part of .NET, both from MICROSOFT CORPORATION or the Java Runtime Environment (JRE) from ORACLE CORPORATION. In other embodiments, the runtime environment 130 may be considered execution directly by a processor.

If the runtime compiler 120 is a Just-in-Time (JIT) compiler, then runtime compilation occurs in preparation for immediate execution of the resulting machine code. That is, the compiled machine code is generally executed immediately after it is compiled by the runtime compiler 120. While JIT compilation allows for the dynamic compilation of the machine code 121 at runtime, it often consumes a large processing overhead that can negatively impact overall performance as the machine code is compiled and executed during the same time period.

The runtime compiler 120 may alternatively be an Ahead-of-Time (AOT) compiler, in which case the resulting machine code 121 can be executed well after platform compilation time. In AOT compiling, the machine code 121 is generally compiled at design time of the source code 101. The compiled machine code 121 is then stored to disk and is directly executed by the runtime environment 130 at runtime. AOT compilation thus avoids the large processing overhead of JIT compilation.

Figure 2A:
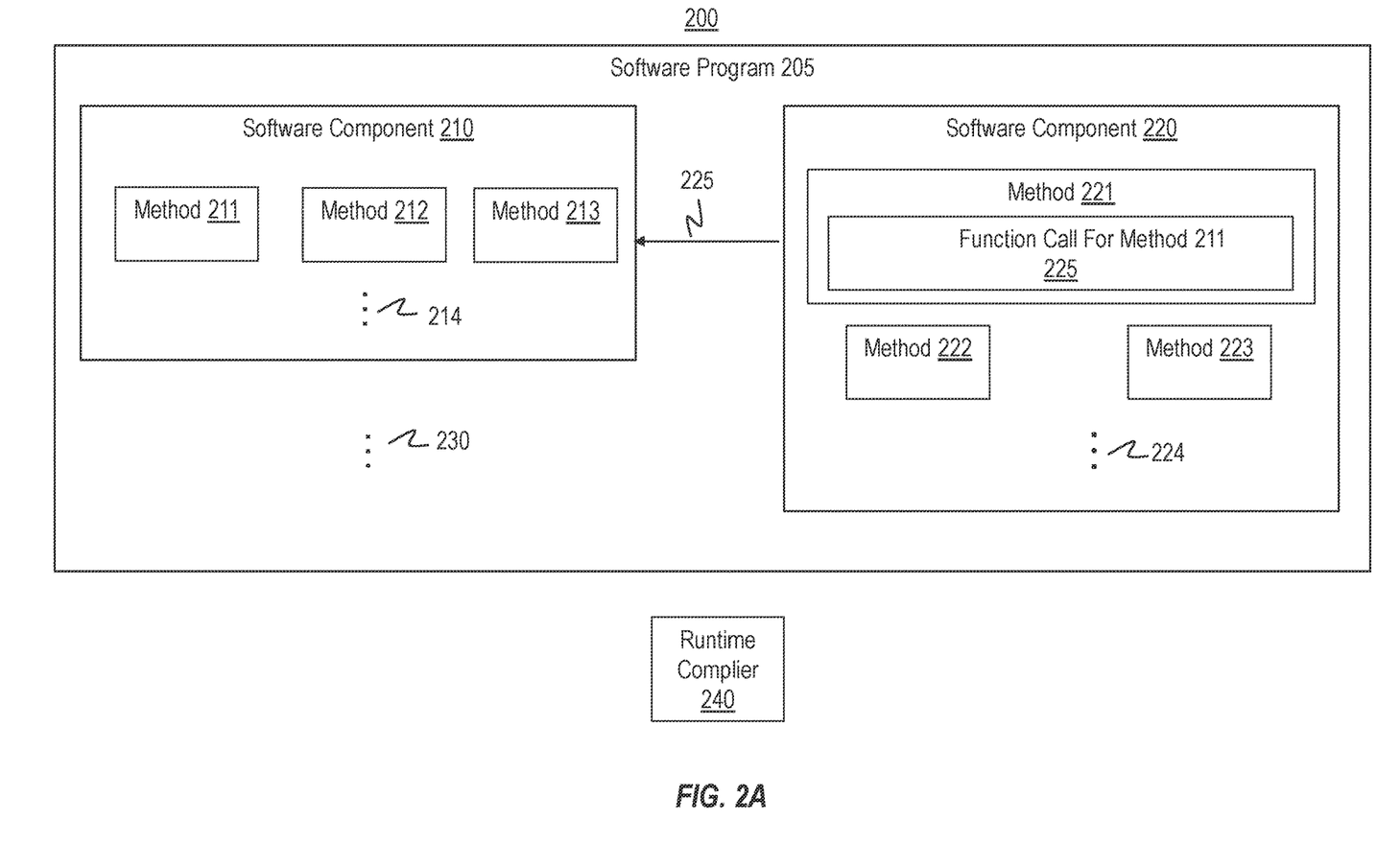
FIGS. 2A and 2B illustrate an inline expansion process.

The embodiments disclosed herein are also related to the concept of code inline expansion or inlining, and this concept will now be discussed. FIG. 2A illustrates an embodiment of a computing system 200 that includes a software program or application 205. The software program or application 205 is divided into a software component 210, a software component 220, and any number of additional software components as illustrated by the ellipses 230. The software components 210, 220, and 230 may be individually executed as part of the overall execution of the software program or application 205.

As shown, the software component 210 includes a first method 211, a second method 212, a third method 213, and any number of additional methods as illustrated by the ellipses 214. The methods 211-214 may be considered as subprocesses or portions of the overall software component 210.

In like manner, the software component 220 includes a first method 221, a second method 222, a third method 223, and any number of additional methods as illustrated by the ellipses 224. The methods 221-224 may be considered as subprocesses or portions of the overall software component 220.

As used in embodiments disclosed herein, the methods 211-214 and the methods 221-224 may be single methods. Alternatively, these methods may be generic types such as those used in .NET or similar systems. The generic types may include a class of objects or may include multiple methods. Accordingly, when the embodiments disclosed herein discuss copying a method, this can mean coping all the objects and methods associated with the generic type or this can mean copying a single method.

As also illustrated, the method 221 includes a function call 225 for the method 211 of software component 210. Although not illustrated, the software component 220 may have other calls for other methods of the software component 210 or one or more of the software components 230. Thus, the software component 220 relies on at least some of the functionality of the software component 210 for its performance. Although not illustrated, the software component 220 may have one or more calls for methods of the software component 210 or one or more of the software components 230.

In a process that does not include inline expansion, when the method 221 is executed by a runtime environment, such as the runtime environment 130, the function call 225 for the method 211 would be made so that the method 211 could be accessed by the software component 220. In addition, any other non-illustrated function calls would also be made. Depending on the number of function calls, the function call 225 and the non-illustrated function calls would have high function-calling-overheads, which may in turn slow down the execution of the software component 220 and possibly the software program or application 205.

Figure 2B:
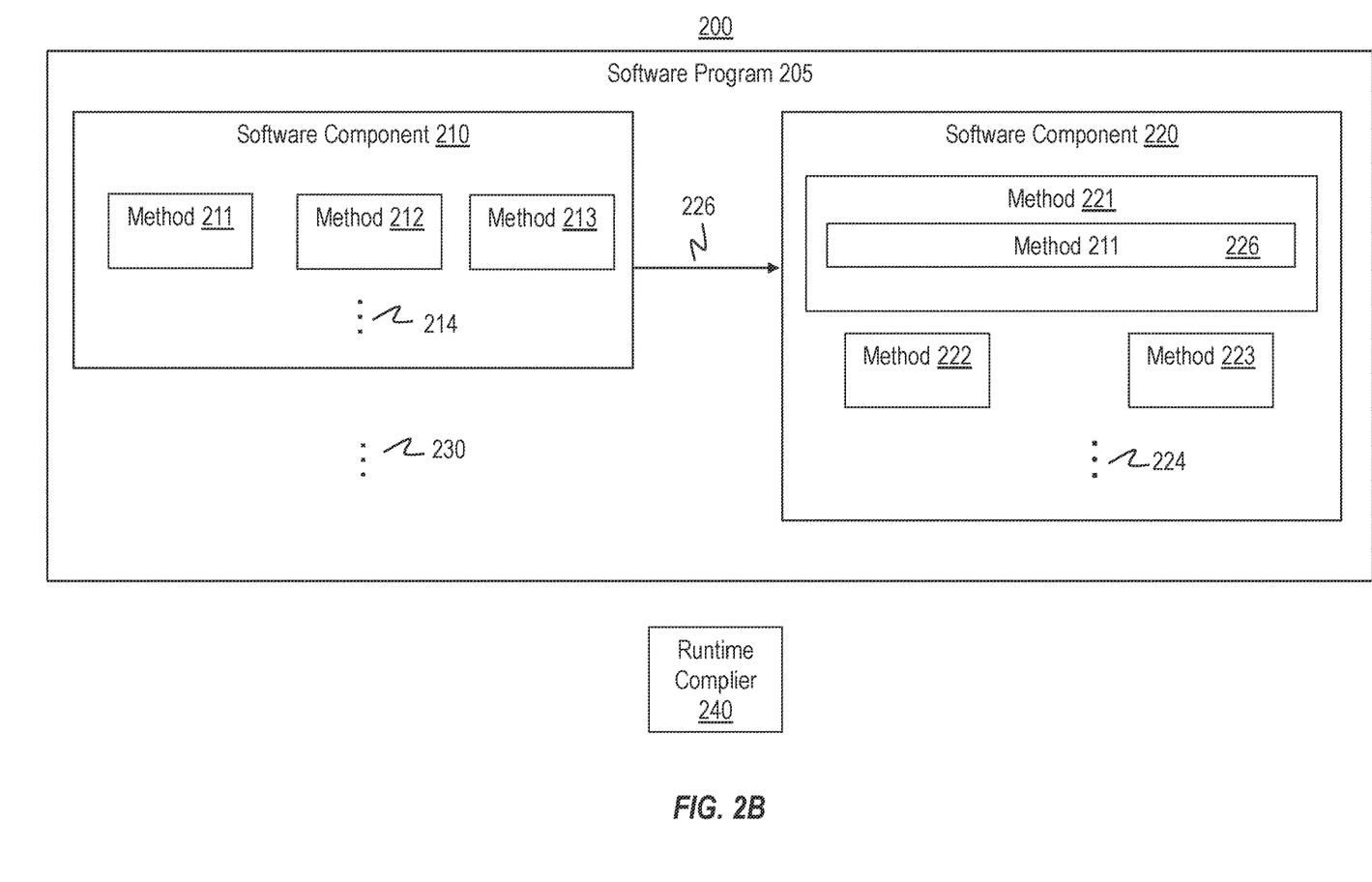

To prevent the high function-calling-overheads, a runtime compiler 240, which may correspond to the runtime compiler 120, performs the inline expansion process as shown in FIG. 2B. During the inline expansion process, the runtime compiler 240 copies the method 211 into the method 221. That is, the runtime compiler 240 copies the method 211 into the method 221 as shown at 226. If the runtime compiler 240 is an AOT compiler, the copy of the method 211 copied into the method 221 may be compiled machine code, such as machine code 121, that is ready to directly execute. If the runtime compiler 240 is a JIT compiler, the copy of the method 211 copied into the method 221 may be intermediate code, such as intermediate code 111, that is compiled and executed at runtime. Alternatively, in some embodiments the copied method 211 may be a copy of the source code, such as source code 101, that is later compiled into intermediate code and/or machine code. Thus, the inline expansion process removes the need to make the function calls since the code is now found in the method 221. This in turn generally speeds up the execution process by removing the high function-calling-overhead. As a further optimization, the runtime compiler 240 may remove the function call 225 from the method 221 as shown by the dashed lines in FIG. 2B.

In addition to speeding up the execution process, the inline expansion process also allows the runtime compiler 240 to perform various other optimizations on both the method 221 that makes the function call and the method 211 that is subject to the function call. These optimizations may include, but are not limited to, improved scheduling, removal of the instructions required for the function call in both the method 211 and the method 212, and reduction in register spilling as registers are no longer needed to pass arguments. In addition, since the inline expansion process essentially removes the need for the method 221 to communicate with the method 211 in regard to the function call, optimizations can be made inside each method without the need for any cross boundary optimizations.

Since the software components 210 and 220 are separate from each other, each of them is able to be updated independently of each other and of any other software component of the underlying software program or application. In addition, while being updated, only one or a subset of the methods of each software component need be updated. Thus, in the embodiment of FIGS. 2A and 2B the method 211 of software component A can be updated, a subset of the methods such as methods 211 and 212 can be updated, or all the methods 211-214 can be updated. The same applies for the methods 221-224 of the software component 220.

As discussed previously, in the embodiment of FIGS. 2A and 2B, the code of method 211 has been copied into the method 221 and otherwise optimized during an inline expansion process. Thus, when the code of method 211 is updated, the inlined code copied into method 221 will also need to be updated in order for the underlying software program or application 205 to properly execute.

As discussed previously, in many instances software components of a software program or application, especially for a software program or application that is large, are shipped separately from each other on different dates to end users. Thus, one software component may be shipped prior to another software component. It is typical for at least one method of the software component that is being shipped to be updated, as this is usually a reason the software component is being shipped to the end users. However, the other software components may not be updated at this time.

For example, the software component 210 may ship with an update to the method 211 on a date prior to the software component 220 being shipped with any updates. Since the code of method 211 has been updated, but the inlined code in method 221 has not been updated to reflect the update to the code of method 211, the software program or application 205 may no longer execute properly since method 221 can no longer rely on the functionality of the updated method 211.

Accordingly, it causes a problem when one software component includes inlined code from another software component that is shipped separately after an update since the inlined code may not also be updated. In the past, one solution to this problem was to not perform the inline expansion process when the software components were going to be separately shipped. This meant that the function calls would remain, but would ensure that the updated method would be accessed by the function call. For example, the function call 225 would ensure that the functionality of the updated method 211 was available to the method 221. However, all the optimization and performance advantages of the inline expansion process previously described would be lost.

Advantageously, the embodiments disclosed herein provide a solution to this problem by providing the technical benefit of a mechanism where software components can be updated and/or shipped separately while still allowing all the advantages of the inline expansion process. This saves on computing resources as the high function-calling-overhead is removed. In addition, the other optimizations that are possible because of the inline expansion process also save on computing resources such as processing resources and improve the operation of the computing system by improving execution time.

Figure 3A:
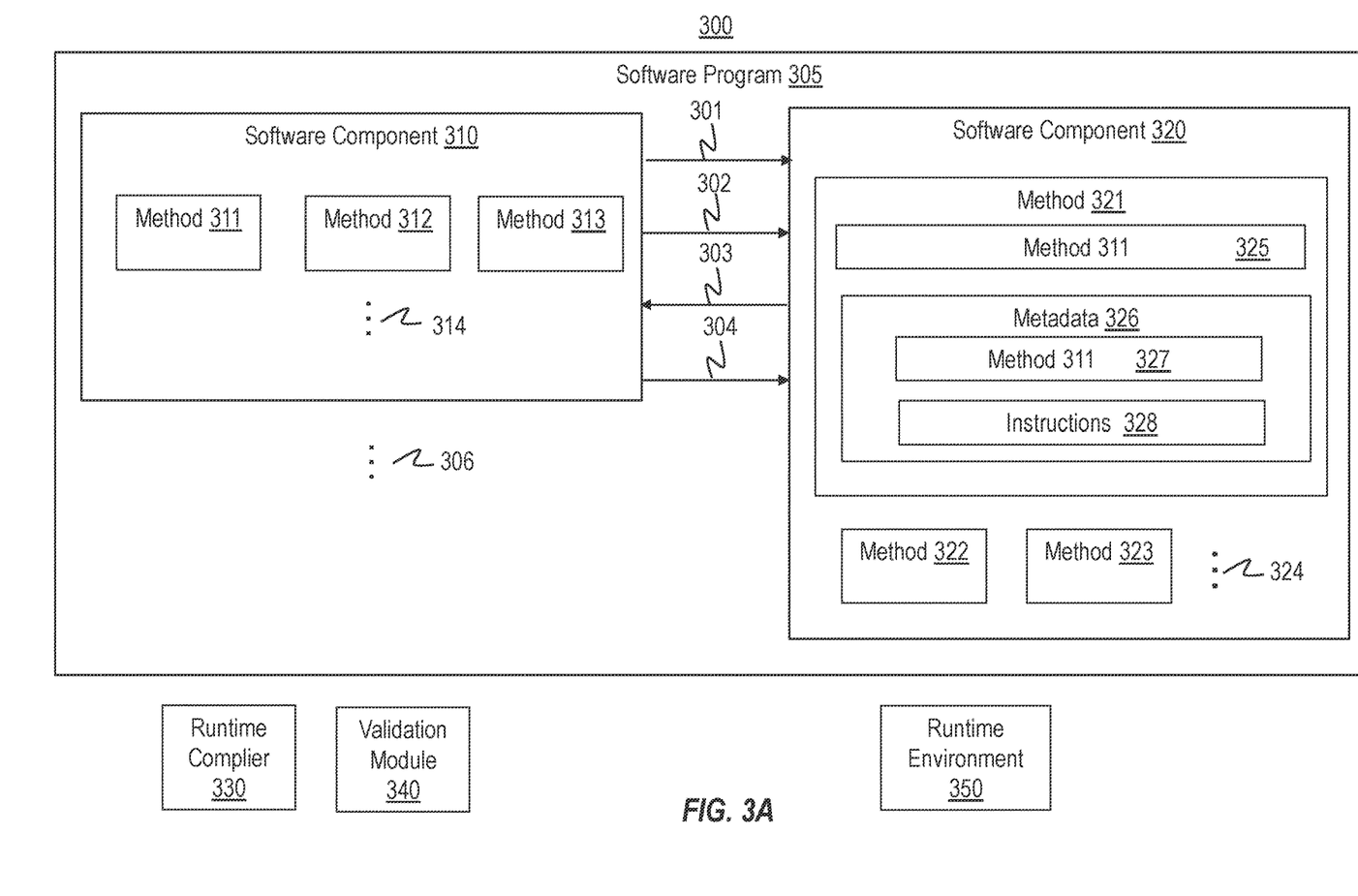
FIG. 3A-3D illustrate an example computing system that determines if an update has been made to a software component who has code inlined in other software component.

FIG. 3A illustrates an embodiment of a computing system 300 where software components can be shipped separately while still allowing all the advantages of the inline expansion process. The computing system 300 includes a software program or application 305. The software program or application 305 is divided into a software component 310, a software component 320, and any number of additional software components as illustrated by the ellipses 306. The software components 310, 320, and 306 may be individually executed as part of the overall execution of the software program or application 305.

As shown, the software component 310 includes a first method 311, a second method 312, a third method 313, and any number of additional methods as illustrated by the ellipses 314. The methods 311-314 may be considered as subprocesses or portions of the overall software component 310. The software component 320 includes a first method 321, a second method 322, a third method 323, and any number of additional methods as illustrated by the ellipses 324. The methods 321-324 may be considered as subprocesses or portions of the overall software component 320.

As used in embodiments disclosed herein, the methods 311-314 and the methods 321-324 may be single methods. Alternatively, these methods may be generic types such as those used in .NET or similar systems. The generic types may include a class of objects or may include multiple methods. Accordingly, when the embodiments disclosed herein discuss copying a method, this can mean coping all the objects and methods associated with the generic type or this can mean copying a single method.

As shown at 301, a runtime compiler 330, which may correspond to the runtime compilers previously discussed, copies the method 311 as shown at 325 into the method 321 during an inline expansion process in the manner previously described in relation to FIGS. 2A and 2B. If the runtime compiler 330 is an AOT compiler, the copy of the method 311 copied into the method 321 may be compiled machine code, such as machine code 121, that is ready to directly execute. If the runtime compiler 330 is a JIT compiler, the copy of the method 311 copied into the method 321 may be intermediate code, such as intermediate code 111, that is compiled and executed at runtime. Alternatively, in some embodiments the copied method 311 may be a copy of the source code, such as source code 101, that is later compiled into intermediate code and/or machine code.

As shown at 302, another copy 327 of the method 311 is copied and included in metadata 326 that is attached to the method 321. In addition, the metadata 326 includes instructions 328. The instructions 328 specify that prior to the execution of the method 321, a validation process should be performed to determine if the method 311 whose code has been inlined in method 321 has been updated or otherwise changed in the software component 310.

In some embodiments, where the copy of the method 311 inlined into the method 321 is AOT compiled machine code, the copy 327 of the method 311 included in the metadata 326 may be intermediate code that matches the intermediate code of method 311 prior to being AOT compiled during the inline expansion process. In other embodiments, the copy 327 of the method 311 included in the metadata 326 may be the source code of the method 311.

The inclusion of the copy 327 of the method 311 and the instructions 328 in the metadata 326 advantageously provides a mechanism for determining before the method 321 is executed if the method 311 has been updated at a time after the inline expansion process occurred. Accordingly, the computing system 300 includes a validation module 340, which in some embodiments may be part of the runtime compiler 330 that performs a validation process in accordance with the instructions 328. As shown at 303, the validation module 340 access the copy 327 of the method 311 that is included in the metadata 326 and also accesses the method 311 from the software component 310. The validation module 340 is then able to compare the copy 327 of the method 311 that is included in the metadata 326 with the method 311 from the software component 310. In other words, the validation module 340 compares the code of the copy 327 with the code of the method 311. In some embodiments, this code may be intermediate code. When the comparison shows that the copy 327 of the method 311 that is included in the metadata 326 and the method 311 from the software component 310 match, the validation module 340 is able to determine that there has not been an update to the method 311 in the time after the inline expansion process. However, if the comparison shows that the copy 327 of the method 311 that is included in the metadata 326 and the method 311 from the software component 310 do not match, the validation module 340 is able to determine that there has been an update to the method 311 in the time after the inline expansion process.

In the embodiment shown in FIG. 3A, the method 311 in the software component 310 is shown as not having been updated. That is, the method 311 is the same as the method 311 inlined into method 321. Accordingly, as shown at 304, the validation module 340 is able to determine that an update has not occurred. Thus, even if the software component 310 has been shipped separately from the software component 320, the software component 320 can still rely on the functionality of the method 311 as previously discussed. In addition, when the method 311 inlined into the method 321 is stored as AOT compiled machine code, a runtime environment 350, which may correspond to the runtime environment 130, is able to directly execute the method 321. In this way, the embodiments disclosed herein preserve the optimizations of the inline expansion process and the advantages of AOT compiling even when the software components ship separately. Of course, even when the method 311 inlined into the method 321 is intermediate code or source code, the embodiment disclosed herein still preserve the optimizations of the inline expansion process when the software components ship separately.

Figure 3B:
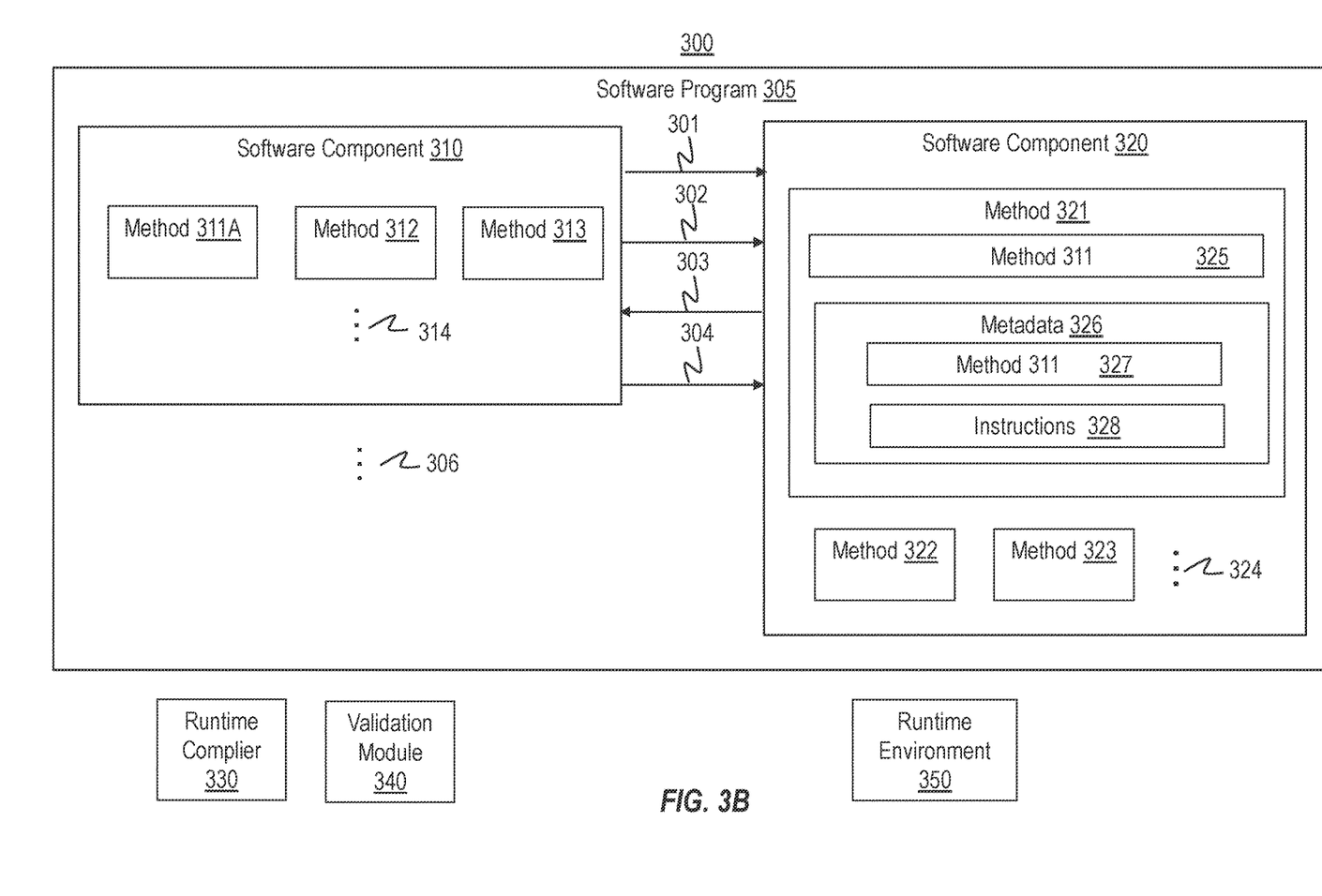

FIG. 3B illustrates an alternative embodiment of the computing system 300. In FIG. 3B, as shown at 301, the method 311 has been copied as shown at 325 into the method 321 during the inline expansion process and, as shown at 302, the copy 327 of the method 311 has also been copied into the metadata 326 as previously discussed in FIG. 3A. However, as shown in FIG. 3B, the software component 310 now includes a method 311A, which represents that the method 311 of FIG. 3A has been updated in the time after the inline expansion process.

As shown at 303, the validation module 340 accesses the method 311A code and the copy 327 of the method 311 in the metadata 326 in the manner previously described and compares them together. Since the two do not match, the validation module 340 is able to determine that an update to the method 311 has occurred as shown at 304.

Since the update has occurred, the method 311 inlined into the method 321 is no longer valid and its execution may cause the software program or application 305 to not properly execute. In some embodiments, in order to ensure proper execution of the software program or application 305, the method 321 will fall back to a function call, such as function call 225, into software component 310 to access the method 311A code. In other words, to ensure that the software program or application 305 is able to continue to be executed when the update has occurred to the method 311, the process reverts back to the state before the inline expansion process and the original version of the method 321 that included the function call is executed.

The method 311A code accessed in response to the function call can then be JIT compiled and executed at runtime by the runtime environment 350. At a later date the software component 320 can be updated so that the method 311A code can be inlined into the method 321. Accordingly, as mentioned previously, the use of the metadata 326 in the embodiments disclosed herein allow for the advantages and optimizations of the inline expansion process since a way is provided to not use any inlined code that has been updated. Thus, inline expansion can be used in cases where an update has not occurred.

Figure 3C:
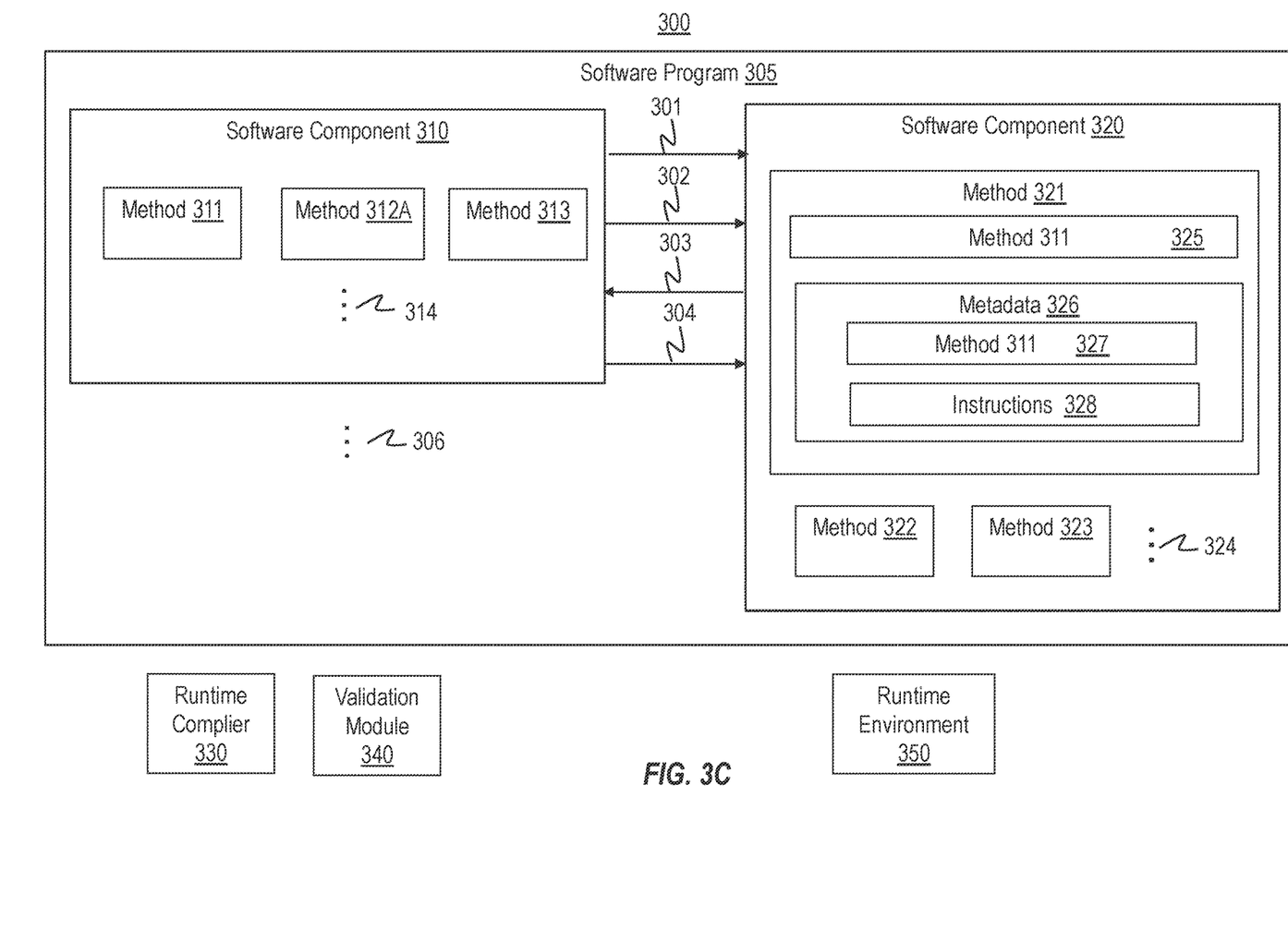

FIG. 3C illustrates an alternative embodiment of the computing system 300. In FIG. 3C, as shown at 301, the method 311 has been copied as shown at 325 into the method 321 during the inline expansion process and, as shown at 302, the copy 327 of the method 311 has also been copied into the metadata 326 as previously discussed in FIG. 3A. However, as shown in FIG. 3C, the software component 310 now includes a method 312A, which represents that the method 312 of FIG. 3A has been updated in the time after the inline expansion process.

As shown at 303, the validation module 340 accesses the method 311 and the copy 327 of the method 311 in the metadata 326 in the manner previously described and compares them together. Since the two match, the validation module 340 is able to determine that an update to the method 311 has not occurred as shown at 304. The method 321 can be executed as previously described in relation to FIG. 3A. Thus, the update to the method 312 has no effect on the method 311 that has been inlined into the method 321 and in turn has no effect on the execution of the method 321.

FIG. 3C shows that in many instances the software component 310 may have an update made to one or more of its methods that will not affect the inlined code in the software component 320. That is, the software component 310 may have a large number of methods, but only have a small subset of that number that are inlined in another software component. Thus, it is possible that updating the software component 310 will have no effect on any other software component that has inlined code from the software component 310. On the other hand, in the case where the update to the software component 310 does affect another software component, then as described in relation to FIG. 3B it will still be possible to prevent any improper execution. Again, this allows for the use of inline expansion when two or more software components are updated and/or shipped separately.

Figure 3D:
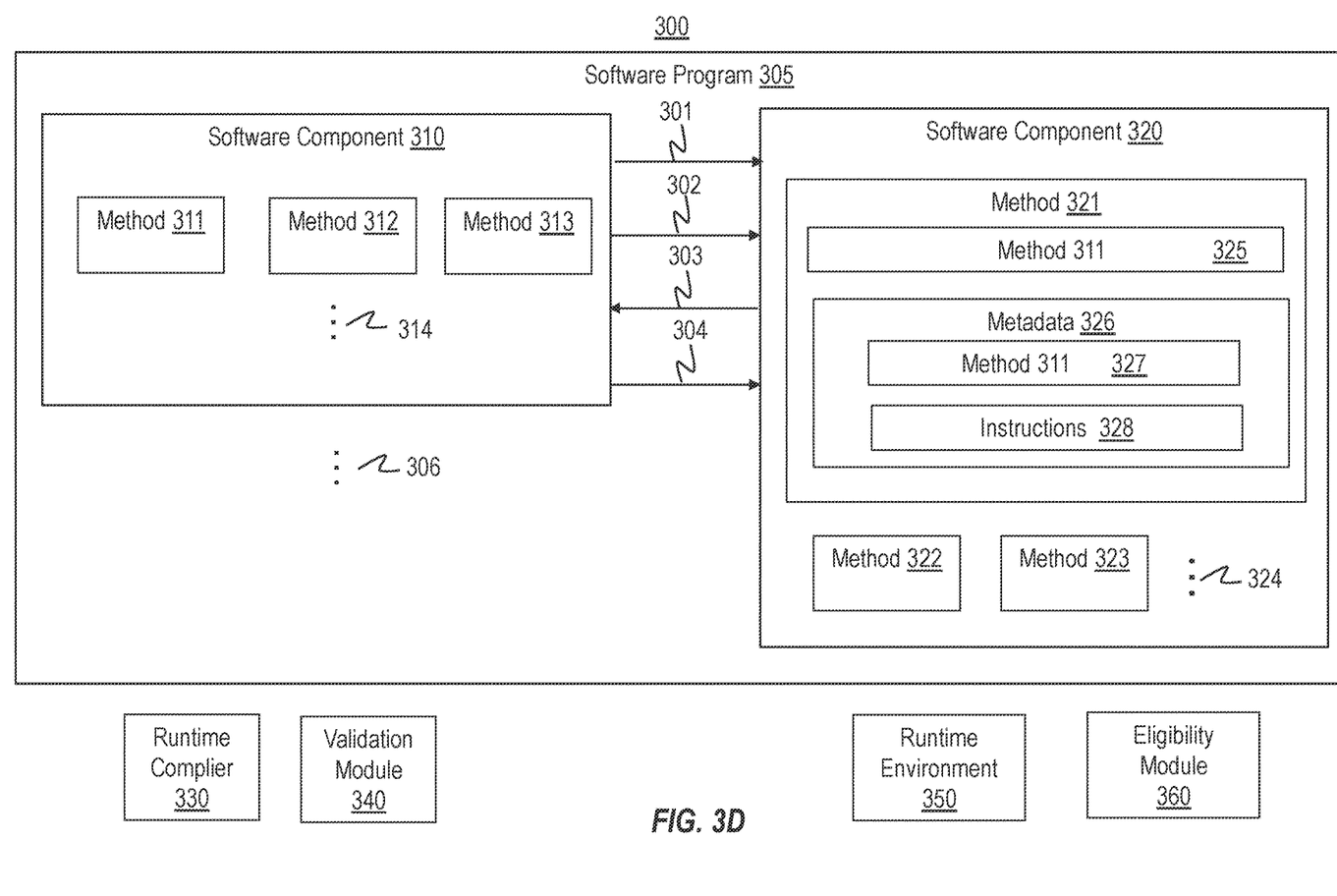

FIG. 3D illustrates a further embodiment of the computing system 300. In this embodiment, the computing system also includes an eligibility module 360. In operation, the eligibility module 360 is able to determine which of the methods 311-314 in software component 310 and which of the methods 321-324 in software component 320 are best suited as candidates for being inlined in another method. This determination may be made based on the size of a method or the complexity of a method. By only allowing those methods best suited for inline expansion to be inlined, the eligibility module helps to improve the performance of the computing system 300.

In the previously described embodiments, the validation module 340 is described as comparing the method 311 with the copy 327 of the method 311 in the metadata 326 during the validation process. In other embodiments, however, the validation process need not be a comparison of the code.

For example, in one embodiment the validation module 340 is able to compare the memory blocks used by the method 311 and the copy 327 of the method 311 in the metadata 326 without the need to interpret the underlying structure. Specifically, in one embodiment, the method 311 is transformed into a special form at runtime that allows for the comparison of memory blocks. The memory blocks of the copy 327 of the method 311 in the metadata 326 are then compared with the memory blocks of the method 311 that has been transformed into the special form at runtime. Thus, the validation module 340 may determine the number of bytes used by the transformed method 311 and the copy 327 of the method 311 in the metadata 326 and determine if they are the same. If they are the same, then the validation is correct and the method 312 can be executed. However, if the number of bytes is not the same, then method 311 has likely been updated and so the validation will fail.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
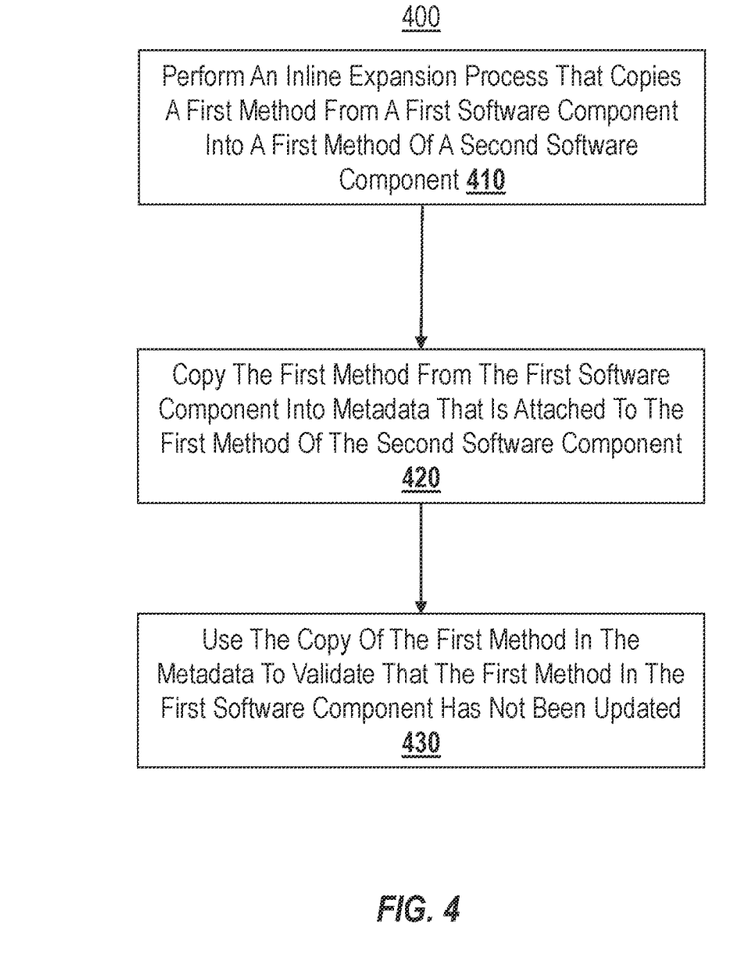
FIG. 4 illustrates a flowchart of an example method for a computing system to determine if a first software component that has shipped separately from a second software component has been updated.

FIG. 4 illustrates a flowchart of an example method 400 for a computing system to determine if a first software component that has shipped separately from a second software component has been updated. The method 400 will be described with respect to one or more of the figures previously discussed.

The method 400 includes performing an inline expansion process that copies a first method from a first software component into a first method of a second software component so that the copied first method is executable when the second method of the second software component is executed (410). For example, as previously described, the method 311 of the software component 310 may be copied into the method 321 of the second software component 320 during the inline expansion process. This makes so the method 311 is directly executable when the method 321 is executed without the need for a function call to the software component 310. In some embodiments, the method 311 may be AOT compiled before being copied into the method 321.

The method 400 includes copying the first method from the first software component into metadata that is attached to the first method of the second software component (420). For example, as previously described, a copy 327 of the method 311 is copied into the metadata 326.

The method 400 includes using the copy of the first method in the metadata to validate that the first method in the first software component has not been updated after the inline expansion process has occurred (430). For example, as previously described the validation module 340 uses the copy 327 of the method 311 in the metadata 326 to validate that the method 311 in the first software component 310 has not been updated after the inline expansion process has occurred. In some embodiments, the validation module 340 compares the code of the copy 327 of the method 311 in the metadata 326 to the code of the method 311 in the first software component to see if the code matches. In other embodiments, the validation module 340 compares memory blocks used by the copy 327 of the method 311 in the metadata 326 and the method 311 in the first software component.

Finally, because the principles described herein may be performed in the context of a computing system some introductory discussion of a computing system will be described with respect to FIG. 5. Computing systems are now increasingly taking a wide variety of forms. Computing systems may, for example, be hand-held devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 5:
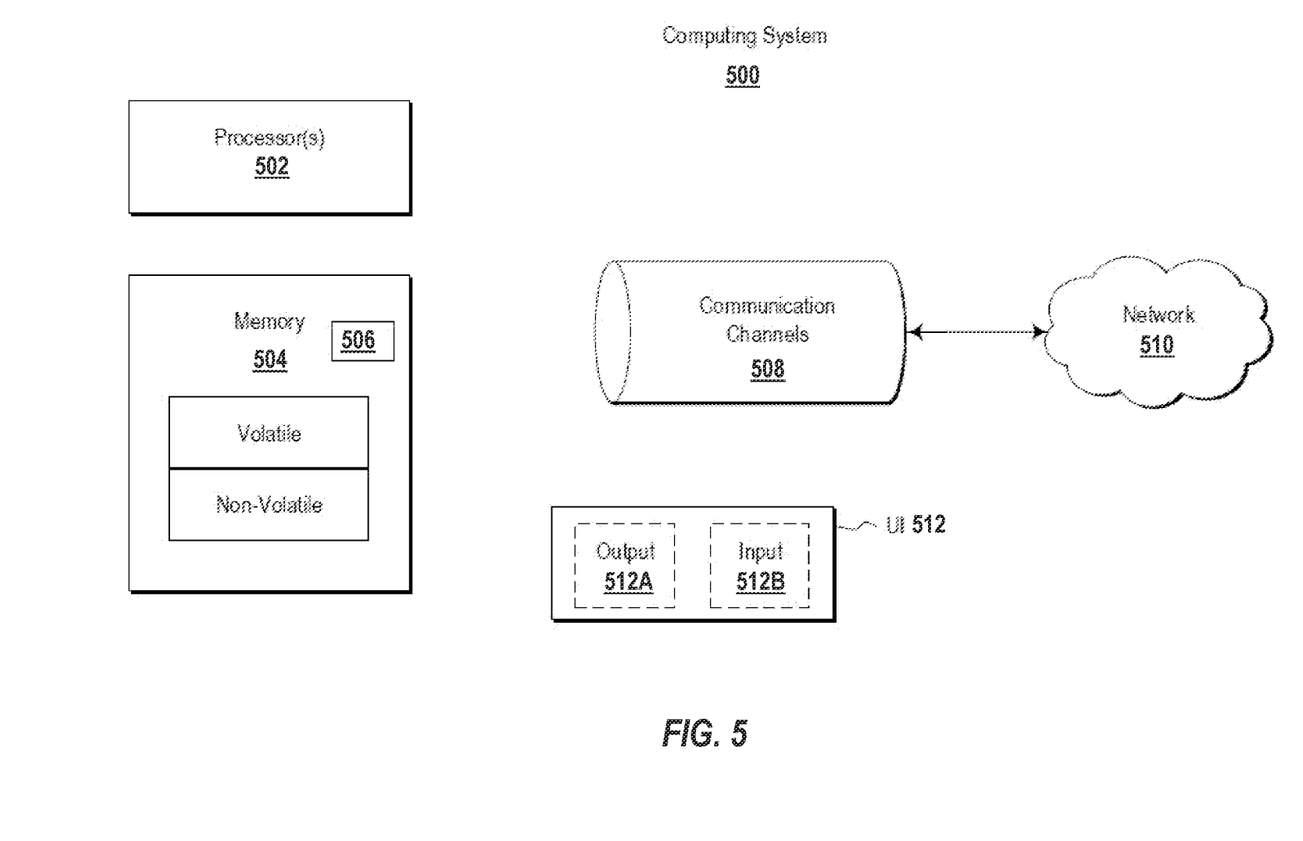
FIG. 5 illustrates an example computing system in which the embodiment described herein may be employed.

As illustrated in FIG. 5, in its most basic configuration, a computing system 500 typically includes at least one hardware processing unit 502 and memory 504. The processing unit 502 may include a general-purpose processor and may also include a field-programmable gate array (FPGA), an application-specific integrated circuit (ASIC), or any other specialized circuit. The memory 504 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 500 also has thereon multiple structures often referred to as an "executable component". For instance, memory 504 of the computing system 500 is illustrated as including executable component 506. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description above, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied in one or more computer-readable media that form a computer program product. An example of such an operation involves the manipulation of data. If such acts are implemented exclusively or near-exclusively in hardware, such as within an FPGA or an ASIC, the computer-executable instructions may be hardcoded or hard-wired logic gates. The computer-executable instructions (and the manipulated data) may be stored in the memory 504 of the computing system 500. Computing system 500 may also contain communication channels 508 that allow the computing system 500 to communicate with other computing systems over, for example, network 510.

While not all computing systems require a user interface, in some embodiments, the computing system 500 includes a user interface system 512 for use in interfacing with a user. The user interface system 512 may include output mechanisms 512A as well as input mechanisms 512B. The principles described herein are not limited to the precise output mechanisms 512A or input mechanisms 512B as such will depend on the nature of the device. However, output mechanisms 512A might include, for instance, speakers, displays, tactile output, holograms, and so forth. Examples of input mechanisms 512B might include, for instance, microphones, touchscreens, holograms, cameras, keyboards, mouse or other pointer input, sensors of any type, and so forth.

Embodiments described herein may comprise or utilize a special purpose or general-purpose computing system, including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable hardware storage media or devices include RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hard-wired, wireless, or a combination of hard-wired or wireless) to a computing system, the computing system properly views the connection as a transmission medium. Transmission media can include a network and/or data links that can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer-executable instructions may be, for example, binaries or even instructions that undergo some translation (such as compilation) before direct execution by the processors, such as intermediate format instructions such as assembly language or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, data centers, wearables (such as glasses) and the like. The invention may also be practiced in distributed system environments where local and remote computing systems, which are linked (either by hard-wired data links, wireless data links, or by a combination of hard-wired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing systems which may correspond to the computing system 500 previously described. The computing systems of the remaining figures include various components or functional blocks that may implement the various embodiments disclosed herein, as will be explained. The various components or functional blocks may be implemented on a local computing system or may be implemented on a distributed computing system that includes elements resident in the cloud or that implement aspect of cloud computing. The various components or functional blocks may be implemented as software, hardware, or a combination of software and hardware. The computing systems of the remaining figures may include more or less than the components illustrated in the figures, and some of the components may be combined as circumstances warrant. Although not necessarily illustrated, the various components of the computing systems may access and/or utilize a processor and memory, such as processing unit 502 and memory 504, as needed to perform their various functions.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more processors; and
one or more computer-readable hardware storage devices having stored thereon computer-executable instructions that are structured such that, when executed by the one or more processors, the computer-executable instructions cause the computing system to perform at least:
an inline expansion process that copies a first method from a first software component into a first method of a second software component so that the copied first method is executable when the first method of the second software component is executed;
copying the first method from the first software component into metadata that is attached to the first method of the second software component; and
using the copy of the first method in the metadata to validate that the first method in the first software component has not been updated after the inline expansion process has occurred.

2. The computing system of claim 1, wherein the computing system is further caused to perform:
when it is validated that the first software component has not been updated after the inline expansion process has occurred, executing the first method of the second software component; and
when it is not validated that the first software component has not been updated after the inline expansion process has occurred:
not executing the first method of the second software component; and
executing an original first method of the second software component that existed in the second component prior to the inline expansion process, the original first method including a function call to the first method of the first software component.

3. The computing system of claim 1, wherein causing the computing system to use the copy of the first method in the metadata to validate that the first method comprises:
comparing the copy of the first method in the metadata with the first method in the first software component; and
determining if the first method in the first software component has been updated based on the comparison.

4. The computing system of claim 1, wherein the computing system is further caused to perform:

when it is determined that the copy of the first method in the metadata matches the first method in the first software component, executing the first method of the second software component; and
when it is determined that the copy of the first method in the metadata does not match the first method in the first software component:
not executing the first method of the second software component, and
executing an original first method of the second software component that existed in the second component prior to the inline expansion process, the original first method including a function call to the first method of the first software component.

5. The computing system of claim 1, wherein causing the computing system to use the copy of the first method in the metadata to validate that the first method comprises:
comparing memory blocks used by the copy of the first method in the metadata with memory blocks used by the first method in the first software component; and
determining if the first method in the first software component has been updated based on the comparison.

6. The computing system of claim 5, wherein the computing system is further caused to perform:
when it is determined that the memory blocks used by the copy of the first method in the metadata matches the memory blocks used by the first method in the first software component, executing the first method of the second software component; and
when it is determined that the memory blocks used by the copy of the first method in the metadata does not match the memory blocks used by the first method in the first software component:
not executing the first method of the second software component, and
executing an original first method of the second software component that existed in the second component prior to the inline expansion process, the original first method including a function call to the first method of the first software component.

7. The computing system of claim 1, wherein the copy of the first method from the first software component is ahead-of-time (AOT) compiled before being copied into the first method of the second software component.

8. The computing system of claim 1, where the first method of the first software component is a single method.

9. The computing system of claim 1, where the first method of the first software component is a generic type that includes multiple methods.

10. The computing system of claim 1, wherein the computing system is further caused to perform:
determining when the first method of the first software component should be subjected to the inline expansion process.

11. A computing system comprising:
a first software component having one or more methods;
a second software component having one or more methods, the first and second software components being configured to be updated and/or shipped separately from each other;
one or more processors; and
one or more computer-readable hardware storage devices having stored thereon computer-executable instructions that are structured such that, when executed by the one or more processors, the computer-executable instructions cause the computing system to:

in response to a function call included in a first method of the second software component, perform an inline expansion process that copies a first method from the first software component into the first method of the second software component, the first method of the first software component being ahead-of-time (AOT) compiled when being copied into the first method of the first software component;

copying the first method from the first software component into metadata that is attached to the first method of the second software component; and comparing the first method of the first software component with the first method of the first software component that is copied into the metadata to determine if the first method of the first software component has been updated.

12. The computing system of claim 11, wherein the computing system is further caused to perform:

determining that the first method of the first software component has not been updated when the first method of the first software component matches the first method of the first software component that is copied into the metadata; and executing the first method of the second software component including the first method of the first software component that was copied into the first method of the second software component during the inline expansion process.

13. The computing system of claim 11, wherein the computing system is further caused to perform:

determining that the first method of the first software component has been updated when the first method of the first software component does not match the first method of the first software component that was copied into the metadata;

in response to the determination, not using the first method of the first software component that was copied into the first method of the second software component during the inline expansion process;

performing a function call for the updated first method of the first software component so that the first method of the second software component can access the updated first method of the first software component; and performing just-in-time (JIT) compiling on the updated first method of the first software component and the first method of the second software component when executing these methods.

14. A method for a computing system to determine if a first software component that has shipped separately from a second software component has been updated, the method comprising:

performing an inline expansion process that copies a first method of the first software component into a first method of a second software component so that the copied first method is executable when the second method of the second software component is executed;

copying the first method from the first software component into metadata that is attached to the first method of the second software component; and using the copy of the first method in the metadata to validate that the first method in the first software component has not been updated.

15. The method of claim 14, further comprising:

executing the first method of the second software component when it is validated that the first software component has not been updated.

16. The method of claim 14, wherein using the copy of the first method in the metadata to validate that the first method has not been updated comprises:

comparing the copy of the first method in the metadata with the first method in the first software component; and determining if the first method in the first software component has been updated based on the comparison.

17. The method of claim 16, further comprising:

executing the first method of the second software component when it is determined that the copy of the first method in the metadata matches the first method in the first software component.

18. The method of claim 14, wherein using the copy of the first method in the metadata to validate that the first method has not been updated comprises:

comparing memory blocks used by the copy of the first method in the metadata with memory blocks used by the first method in the first software component; and determining if the first method in the first software component has been updated based on the comparison.

19. The method of claim 18, further comprising:

executing the first method of the second software component when it is determined that the memory blocks used by the copy of the first method in the metadata matches the memory blocks used by the first method in the first software component.

20. The method of claim 14, wherein the copy of the first method of the first software component is ahead-of-time (AOT) compiled before being copied into the first method of the second software component.

* * * * *